(12) United States Patent
Takanashi et al.

(10) Patent No.: US 11,609,487 B2
(45) Date of Patent: Mar. 21, 2023

(54) PROJECTION SCREEN CONTROL METHOD AND PROJECTIOIN-TYPE DISPLAY DEVICE

(71) Applicant: SONY CORPORATION, Tokyo (JP)

(72) Inventors: Hidehiko Takanashi, Kanagawa (JP); Hideki Ono, Tokyo (JP); Yui Ishii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 91 days.

(21) Appl. No.: 17/040,534

(22) PCT Filed: Mar. 7, 2019

(86) PCT No.: PCT/JP2019/009080
§ 371 (c)(1),
(2) Date: Sep. 22, 2020

(87) PCT Pub. No.: WO2019/188086
PCT Pub. Date: Oct. 3, 2019

(65) Prior Publication Data
US 2021/0026233 A1    Jan. 28, 2021

(30) Foreign Application Priority Data
Mar. 30, 2018    (JP) .............................. JP2018-067313

(51) Int. Cl.
*G03B 21/62*    (2014.01)
*G03B 21/20*    (2006.01)
(Continued)

(52) U.S. Cl.
CPC ......... *G03B 21/62* (2013.01); *G02F 1/13718* (2013.01); *G03B 21/2013* (2013.01); *G03B 21/2053* (2013.01); *H04N 9/3155* (2013.01)

(58) Field of Classification Search
CPC ...... G03B 21/14; G03B 21/56; G03B 21/567; G03B 21/2053; G03B 21/2013;
(Continued)

(56) References Cited

U.S. PATENT DOCUMENTS 6,986,581 B2 *   1/2006   Sun ........................ G03B 21/60
                                                         359/452
7,885,003 B2 *   2/2011   Kodama .............. G02B 5/0242
                                                         359/457
(Continued)

FOREIGN PATENT DOCUMENTS

CN    101069127 A    11/2007
CN    101405651 A    4/2009
(Continued)

OTHER PUBLICATIONS

International Search Report and Written Opinion of PCT Application No. PCT/JP2019/009080, datedApr. 16, 2019, 11 pages of ISRWO.

*Primary Examiner* — William C. Dowling
(74) *Attorney, Agent, or Firm* — Chip Law Group

(57) ABSTRACT

A projection screen control method of one embodiment of the present disclosure includes irradiating a display member with first control light, and irradiating the display member with second control light, in which the irradiating the display member with the first control light and the irradiating the display member with the second control light are performed in sequence. The display member has a visible light transmittance or a visible light reflectance that varies depending on light, and contains a photochromic material, and the first control light and the second control light have different light intensities.

16 Claims, 9 Drawing Sheets

(51) Int. Cl.
*G02F 1/137* (2006.01)
*H04N 9/31* (2006.01)

(58) Field of Classification Search
CPC ........ G03B 21/60; H04N 9/31; H04N 9/3155;
G02F 1/13718
USPC .................................................. 359/443, 459
See application file for complete search history.

(56) References Cited

U.S. PATENT DOCUMENTS

| | | | |
|---|---|---|---|
| 7,914,154 B2* | 3/2011 | Obi | ........................ G03B 21/56 |
| | | | 359/443 |
| 10,564,536 B2* | 2/2020 | Pan | ........................ G03B 21/56 |
| 11,061,314 B2* | 7/2021 | Nakahata | ............. G03B 21/625 |
| 2005/0094109 A1 | 5/2005 | Sun et al. | |
| 2009/0091718 A1 | 4/2009 | Obi et al. | |
| 2009/0190211 A1 | 7/2009 | Kodama et al. | |

FOREIGN PATENT DOCUMENTS

| | | |
|---|---|---|
| EP | 1680708 A2 | 7/2006 |
| JP | 05-197021 A | 8/1993 |
| JP | 2007-271645 A | 10/2007 |
| JP | 2008-506972 A | 3/2008 |
| JP | 2010-079185 A | 4/2010 |
| JP | 2012-220668 A | 11/2012 |
| JP | 2013-076955 A | 4/2013 |
| JP | 2013-122490 A | 6/2013 |
| WO | 2005/043232 A2 | 5/2005 |
| WO | 2006/075617 A1 | 7/2006 |
| WO | 2007/108387 A1 | 9/2007 |

\* cited by examiner

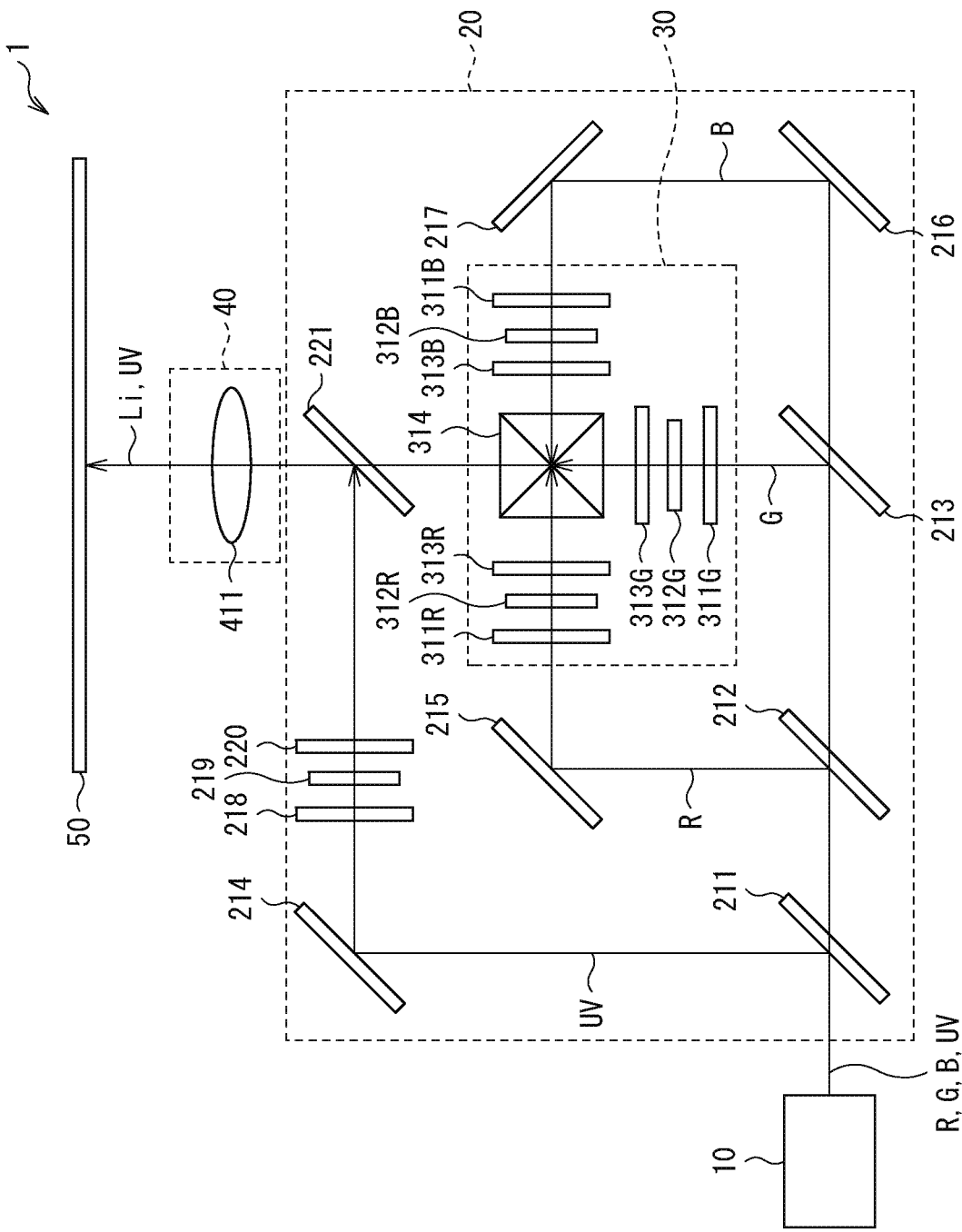
[FIG. 1]

[FIG. 2]
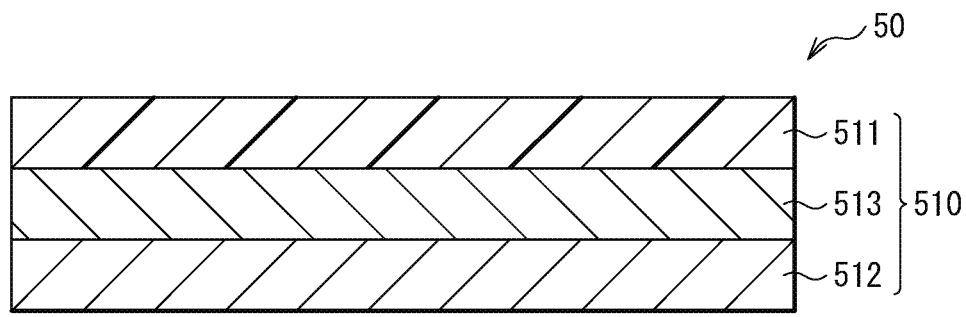
[FIG. 3]
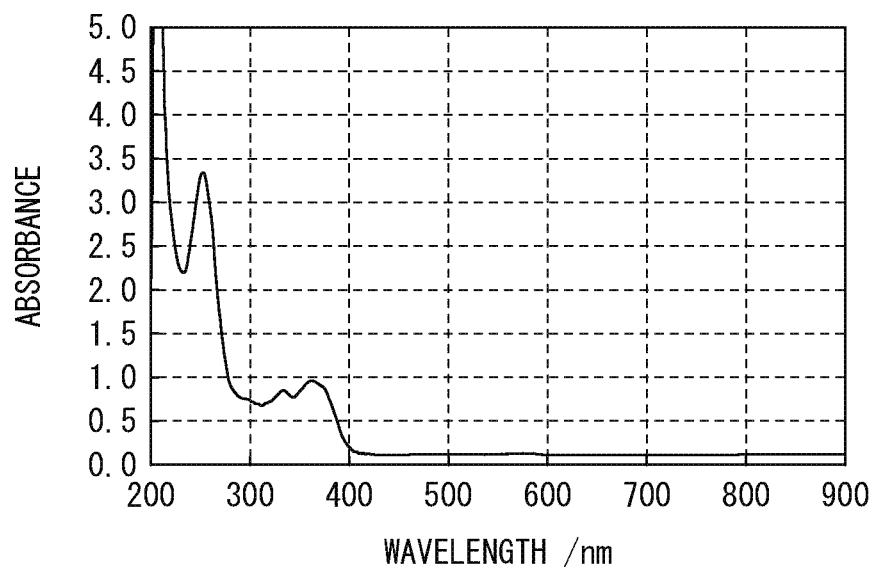

[FIG. 4]
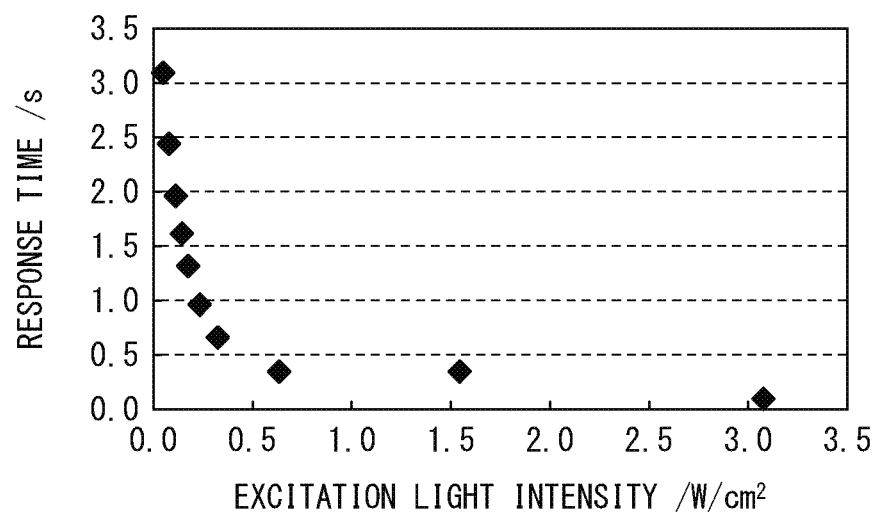
[FIG. 5]
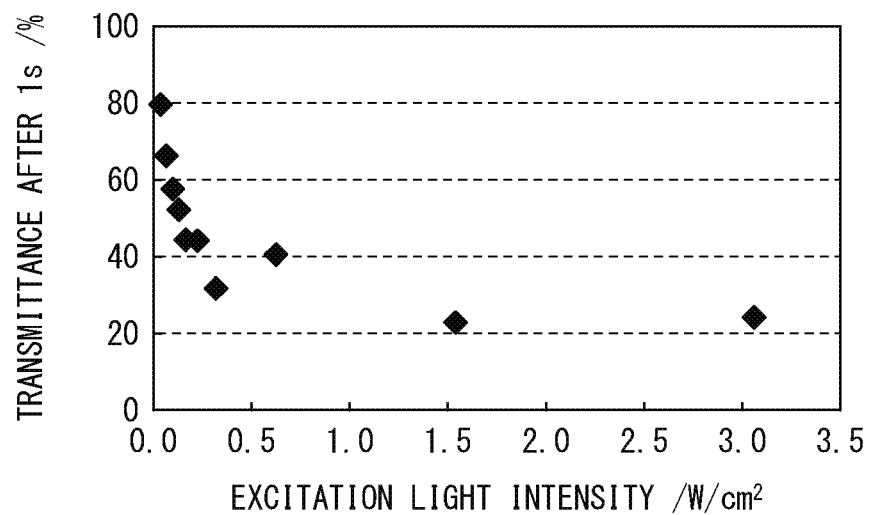

[FIG. 6]
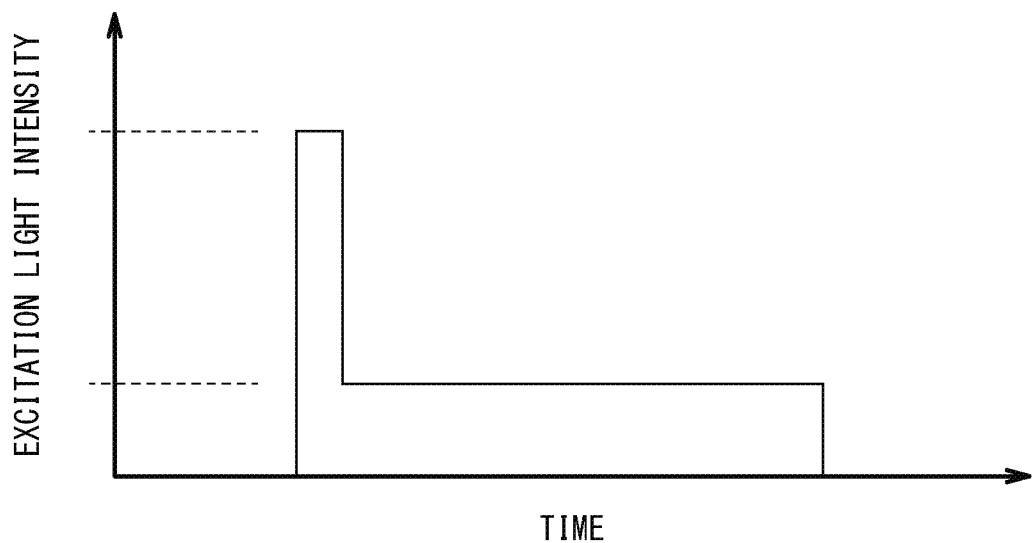
[FIG. 7]
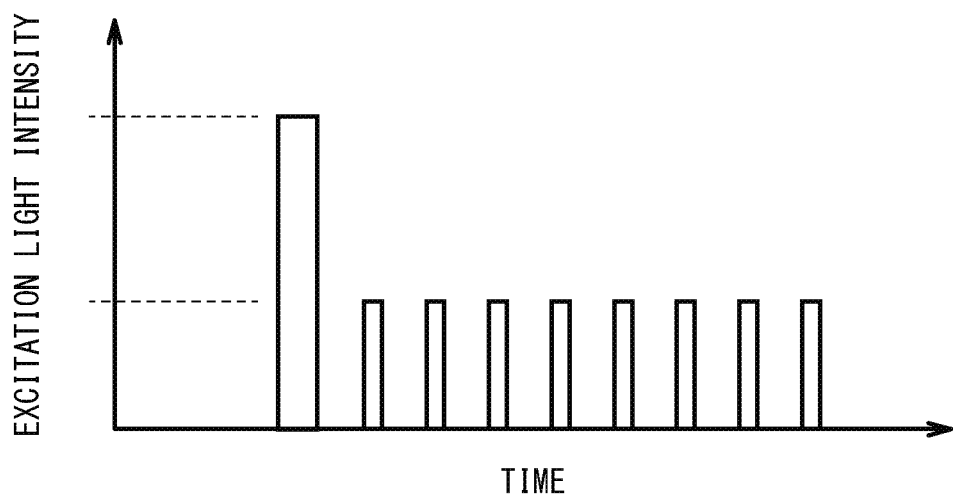

[FIG. 8]
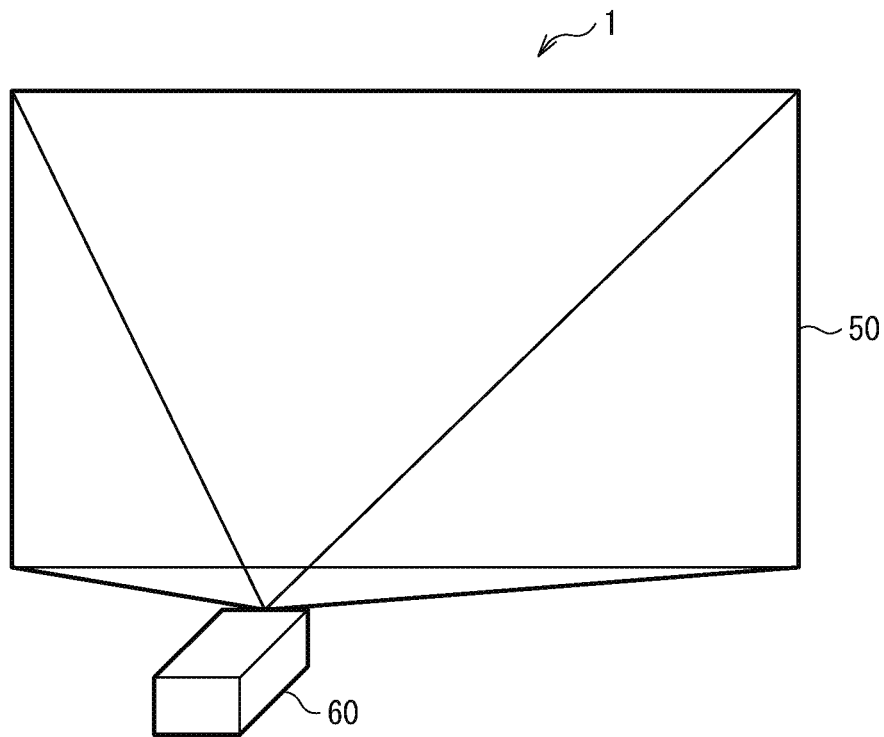
[FIG. 9]
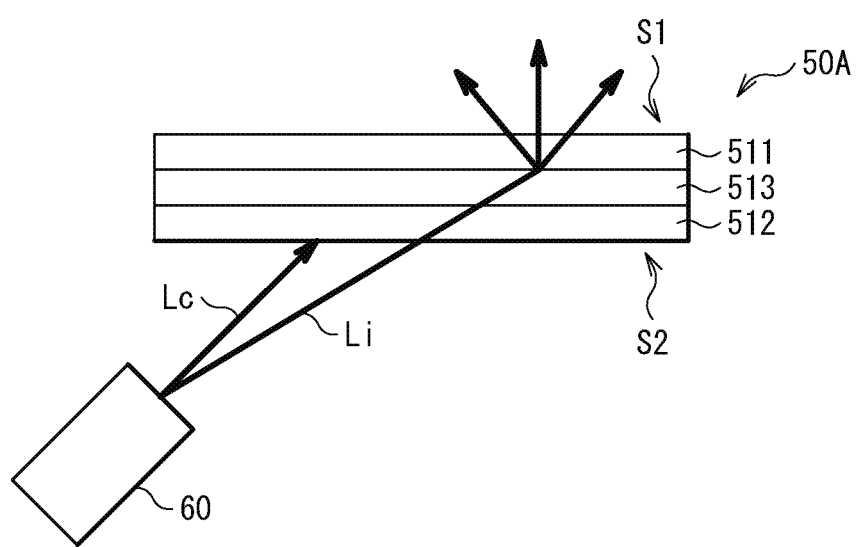

[FIG. 10]
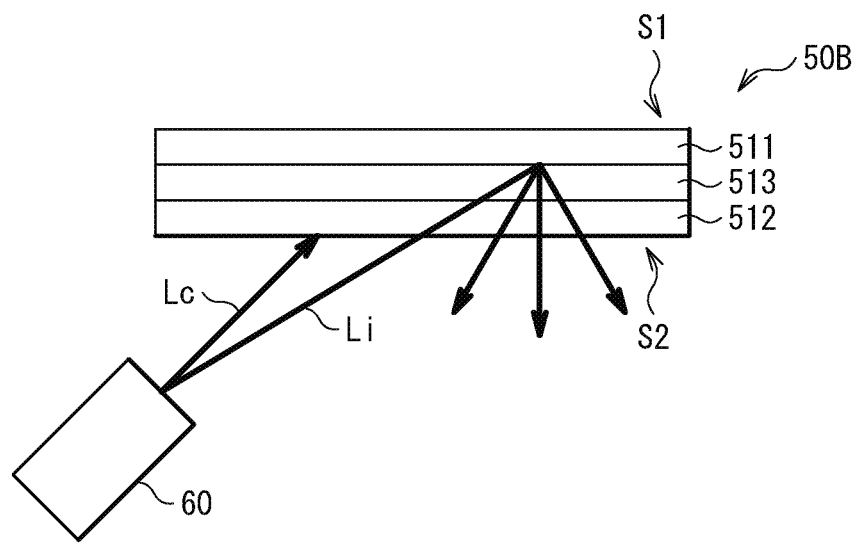
[FIG. 11]
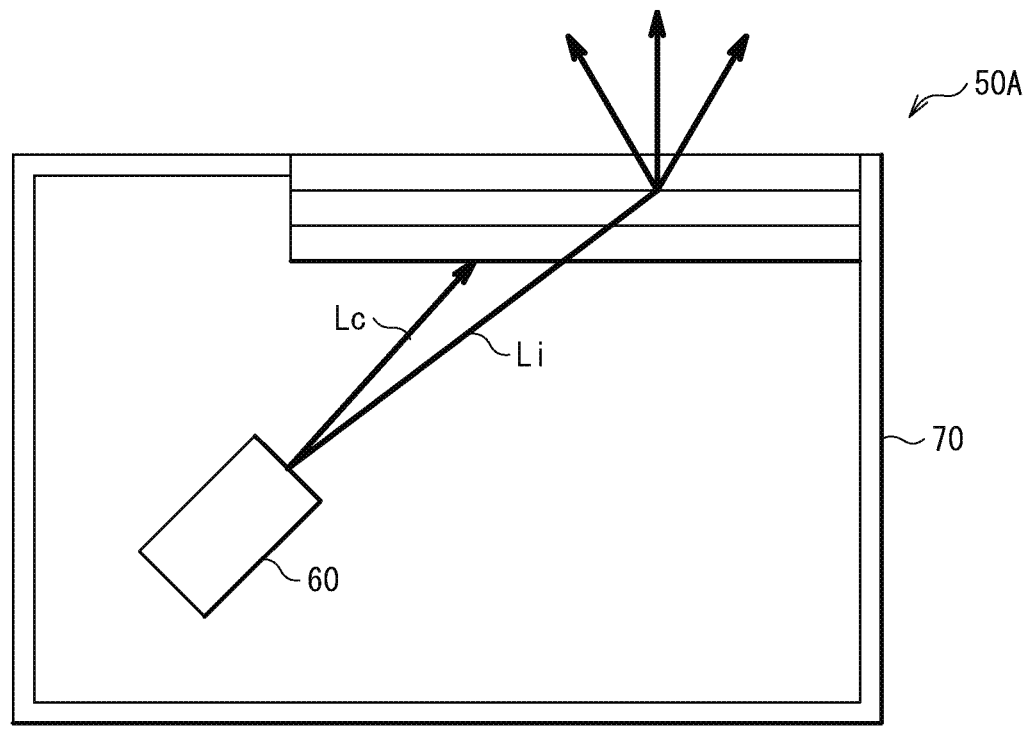

[FIG. 12]
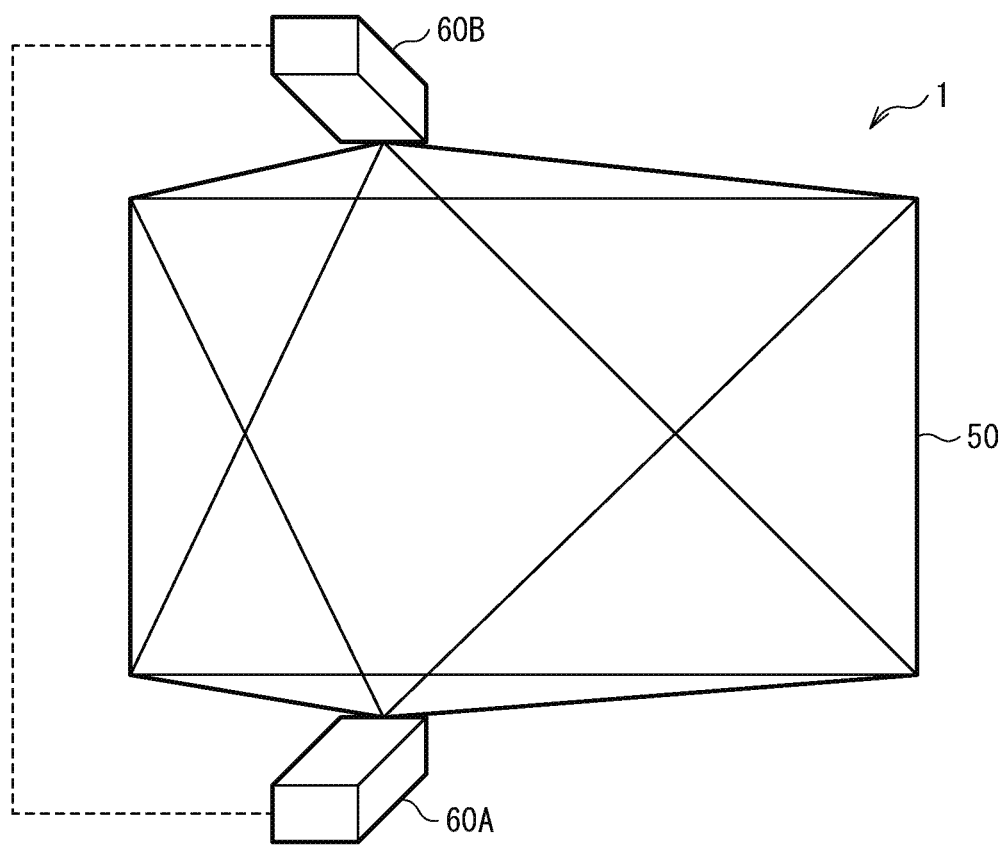

[FIG. 13]
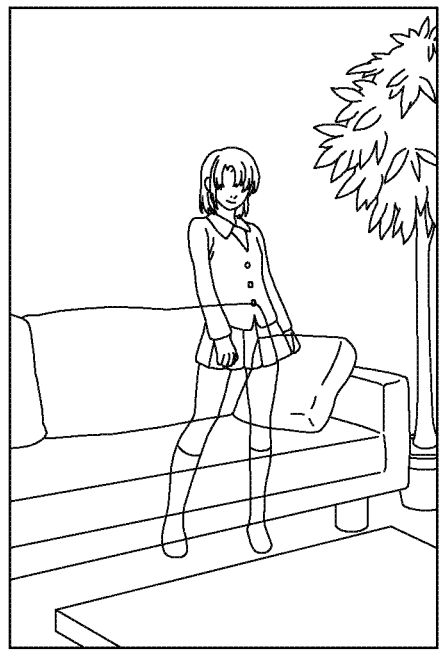
[FIG. 14]
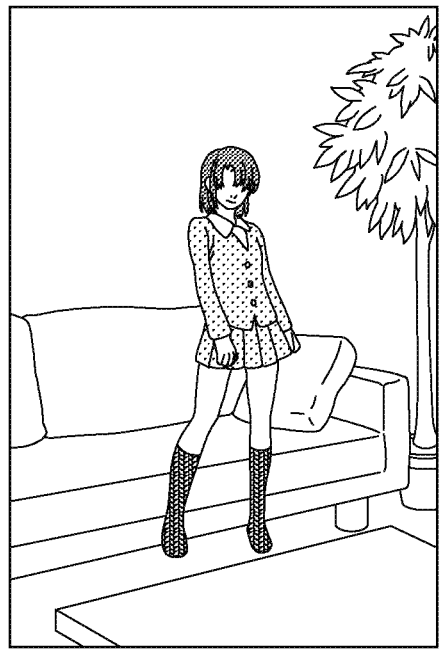

[FIG. 15]
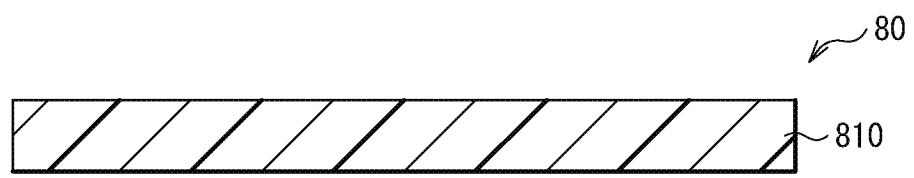
[FIG. 16]
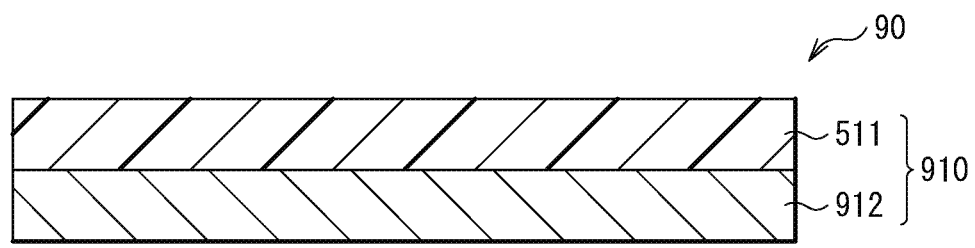

PROJECTION SCREEN CONTROL METHOD AND PROJECTIOIN-TYPE DISPLAY DEVICE

CROSS REFERENCE TO RELATED APPLICATIONS

This application is a U.S. National Phase of International Patent Application No. PCT/JP2019/009080 filed on Mar. 7, 2019, which claims priority benefit of Japanese Patent Application No. JP 2018-067313 filed in the Japan Patent Office on Mar. 30, 2018. Each of the above-referenced applications is hereby incorporated herein by reference in its entirety.

TECHNICAL FIELD

The present disclosure relates to a control method of a projection screen that has a light modulation function, and a projection-type display apparatus equipped with the same, for example.

BACKGROUND ART

In an image display that uses a common projector, the background luminance is at a black level. Accordingly, under a bright environment where a screen has a large amount of reflection light, the contrast of the displayed image is reduced, resulting in poor visibility. This tendency is evident, in particular, with transparent screens.

It is possible to improve the poor visibility by reducing the black level lower than the background luminance. Light modulation of the screen is possible, for example, by combining a TFT (Thin Film Transistor) liquid crystal and a PDLC (Polymer Dispersed Liquid Crystal). In this case, however, where an active device such as a TFT is used in the screen, a cost increase and size limitations etc. arise, which in turn compromises the advantage of a projector that allows for display of any desired size. Moreover, for transparent screens, this is a cause of a reduction in transmittance.

In this regard, Patent Literature 1, for example, discloses a screen including a first liquid crystal layer region switchable between a transmissive state and a scattering state by application of a voltage, and a second liquid crystal layer region provided outside the first liquid crystal layer region, containing a liquid crystal and a dichroic dye, and switchable between a transmissive state and a colored state by application of a voltage. This screen enhances the feel of contrast by displaying an image in the first liquid crystal region in the scattering state while causing the second liquid crystal region outside the first liquid crystal region to be in the colored state.

CITATION LIST

Patent Literature

PTL 1: Japanese Unexamined Patent Application Publication No. 2013-76955

SUMMARY OF THE INVENTION

Thus development of a screen that allows for improvement of display qualities including visibility is sought after.

It is desirable to provide a projection screen control method and a projection-type display apparatus that allow for improvement of display quality.

A projection screen control method according to one embodiment of the present disclosure includes: irradiating a display member with first control light; and irradiating the display member with second control light, in which the irradiating the display member with the first control light and the irradiating the display member with the second control light are performed in sequence. The display member has a visible light transmittance or a visible light reflectance that varies depending on light, and contains a photochromic material, and the first control light and the second control light have different light intensities.

A projection-type display apparatus according to one embodiment of the present disclosure includes: a light source unit; an image generation optical system that generates image light by modulating, on the basis of an input image signal, light from the light source unit; a projection optical system that projects the image light generated by the image generation optical system; and a projection screen that displays the image light projected from the projection optical system. The projection screen includes a display member, in which the display member has a visible light transmittance or a visible light reflectance that varies depending on light, and contains a photochromic material. The light source unit includes a first light source section that outputs first control light and second control light that have different light intensities.

In the projection screen control method according to one embodiment of the present disclosure and the projection-type display apparatus according to one embodiment of the present disclosure, the display member having the visible light transmittance or the visible light reflectance that varies depending on the light and containing the photochromic material is irradiated with the first control light and the second control light in sequence. The first control light and the second control light have different light intensities. This controls the coloring speed and coloring condition of the photochromic material.

According to the projection screen control method of one embodiment of the present disclosure and the projection-type display apparatus of one embodiment of the present disclosure, the display member having the visible light transmittance or the visible light reflectance that varies depending on the light and containing the photochromic material is irradiated with the first control light and the second control light in sequence. The first control light and the second control light have different light intensities. Therefore, it is possible to control the coloring speed and coloring condition of the photochromic material and to control a black level of the projection screen. Accordingly, it is possible to improve display quality of images to be projected on a projection screen.

Note, effects are not necessarily limited to those described here and may be any of other effects described in the present disclosure.

BRIEF DESCRIPTION OF DRAWINGS

FIG. 1 is a view of one example of a schematic configuration of a projection-type display apparatus according to one embodiment of the present disclosure.

FIG. 2 is a cross-sectional view of a configuration of a screen illustrated in FIG. 1.

FIG. 3 is an absorption spectrum diagram of TPC-0033 that is one example of a photochromic material.

FIG. 4 is a characteristics chart that illustrates a relationship between excitation light intensity and response speed of a light modulation layer containing TPC-0033.

FIG. 5 is a characteristics chart that illustrates a relationship between excitation light intensity and transmittance after one second of a light modulation layer containing TPC-0033.

FIG. 6 is a timing chart illustrating one example of an irradiation pattern for the screen according to the embodiment.

FIG. 7 is a timing chart illustrating another example of an irradiation pattern for the screen according to the embodiment.

FIG. 8 is a schematic diagram that illustrates one example of a positional relationship between the screen and a projection unit of the projection-type display apparatus illustrated in FIG. 1.

FIG. 9 is a schematic diagram for describing one example of a configuration of the screen and the projection unit illustrated in FIG. 8.

FIG. 10 is a schematic diagram for describing another example of the configuration of the screen and the projection unit illustrated in FIG. 8.

FIG. 11 is a schematic diagram that illustrates an entire configuration of the projection-type display apparatus illustrated in FIG. 1.

FIG. 12 is a schematic diagram that illustrates another example of the positional relationship between the screen and the projection unit of the projection-type display apparatus illustrated in FIG. 1.

FIG. 13 is a schematic diagram that illustrates an image display in a common projection-type display apparatus.

FIG. 14 is a schematic diagram that illustrates an image display in the projection-type display apparatus illustrated in FIG. 1.

FIG. 15 is a cross-sectional view of a configuration of a screen according to Modification Example 1 of the present disclosure.

FIG. 16 is a cross-sectional view of a configuration of a screen according to Modification Example 2 of the present disclosure.

MODES FOR CARRYING OUT THE INVENTION

Hereinafter, one embodiment of the present disclosure is described in detail with reference to the drawings. The following description outlines one specific example of the present disclosure. The present disclosure shall not be limited to the embodiments described below. Further, the present disclosure shall not be limited to the arrangements, dimensions, dimensional ratios etc., of each constituent element illustrated in each drawing. Note, the description is given in the following order.
1. Embodiment (Example of a screen control method that uses light of two light intensities as control light)
   1-1. Screen Configuration
   1-2. Screen Control Method
   1-3. Configuration of Projection-type Display Apparatus
   1-4. Workings and Effects
2. Modification Examples
   2-1. (Example of a screen having a display layer and a light modulation layer integral with each other)
   2-2. (Example where a modulation light cut function is added to the light modulation layer)

1. EMBODIMENT

FIG. 1 illustrates a configuration of a projection-type display apparatus (projection-type display apparatus 1) according to one embodiment of the present disclosure. This projection-type display apparatus 1 includes a light source unit 10, an illumination optical system 20, an image forming unit 30, a projection optical system 40, and a screen 50 that displays images generated by the image forming unit 30 and projected by the projection optical system 40. FIG. 2 illustrates a cross-sectional configuration of the screen 50 illustrated in FIG. 1. The projection screen (screen 50) of this embodiment has, as a display member 510 that displays images, a configuration including, for example, a light modulation layer 512 containing a photochromic material, a protection layer 513, and a display layer 511 stacked up in this order, and controls reflectance or transmittance of the light modulation layer 512 using light of different light intensities (first control light and second control light) as modulation light (Lc). Here, the term "image" used in the present disclosure shall include not only still images but also moving images.

1-1. Screen Configuration

The display layer 511 is a commonly used screen, such as a matte screen, a pearl screen, a silver screen, a beads screen, or a transmissive screen. The matte screen is a so-called diffusive screen that includes a fabric or resin sheet having a surface coated with a paint containing a scattering agent, for example. The pearl screen and silver screen are so-called reflective screens having a surface coated with a paint containing pearl resin, or metal powder. The beads screen has a surface coated with optical lens glass beads. The transmissive screen is a translucent screen that includes vinyl, acryl, glass, etc., which exhibits transmissivity to light of wavelengths in the visible range when viewed from front, for example. Note, it is possible to use a wall, for example, or other surfaces as the display layer 511 other than the fabric or resin sheet described above, as long as the RGB light (image light Li) projected from the projection optical system 40 is reflected.

Apart from the above, the display layer 11 may include a hologram, a half mirror, a surface plasmon particle, a cholesteric liquid crystal, a Fresnel lens, and so on.

The light modulation layer 512 is provided for changing the black level of the screen 50 by projection of light of a different wavelength (modulation light (Lc)) from the wavelengths (RGB) used as the image light (Li). The light modulation layer 512 absorbs the modulation light (Lc), which causes the transmittance or reflectance to change (lower). It is preferable to use light of a wavelength of 350 nm or more and 420 nm or less, or 700 nm or more and 2.5 μm or less, for example, as the modulation light (Lc). Specific examples include ultraviolet (UV) and infrared (IR). This allows the transmittance or reflectance of the light modulation layer 512 to change without degrading color representation of images. The term "light modulation" used herein shall mean changing the transmittance or reflectance of the screen 50 to increase the contrast of an image.

A photochromic material, for example, is used to form the light modulation layer 512 so that it is possible to reduce the transmittance or reflectance of an irradiated region of the light modulation layer (Lc) (change to black, for example).

Examples of photochromic materials include photochromic dyes that include organic materials. Photochromic dyes are classified into two types, for example. One is T-type photochromic dyes that return to a transparent state after being colored, and the other is P-type photochromic dyes that return to a transparent state by being exposed to a different wavelength from the light used for coloring.

Examples of T-type photochromic dyes include spiropyran, hexaarylbiimidazole, oxazine, naphthopyran, and azobenzene. Examples of P-type photochromic dyes include fulgide and diarylethene.

It is possible to use any of the photochromic dyes described above for the light modulation layer 512 of this embodiment. The use of the control method to be described later enables a transition time to be shortened, of the transition process from a transparent state to a colored state of T-type photochromic dyes, and of both the transition process from a transparent state to a colored state and the transition process from a colored state to a transparent state of P-type photochromic dyes.

Other than photochromic dyes that are organic materials, inorganic materials such as barium magnesium silicate and silver halide and the like may be used as the photochromic material.

The light modulation layer 512 is formed by forming a film on the display layer 511, for example, the film containing the photochromic material described above dispersed in a matrix such as polymer. The matrix preferably does not absorb the visible range to avoid display degradation. Moreover, the matrix preferably does not absorb the modulation light (Lc). Generally, the photochromic material absorbs light from visible short wavelength region to ultraviolet region (see, for example, FIG. 3). Examples of materials used for the matrix include polymers such as nylon, polylactic acid, polyamide, polyimide, polyethylene terephthalate, polyacrylonitrile, polyethylene oxide, polyvinylcarbazole, polyvinyl chloride, polyurethane, polystyrene, polyvinyl alcohol, polysulfone, polyvinylpyrrolidone, polyvinylidene fluoride, poly-hexafluoropropylene, cellulose acetate, collagen, gelatin, chitosan, or polysiloxane, or copolymers or the like of these. Other examples include organic/inorganic hybrid materials and the like that are combinations of the organic materials listed above and inorganic materials such as silica, alumina, titania, or zirconia.

The light modulation layer 512 preferably contains a photochromic material in a concentration by weight ratio of 0.01% or more and 10% or less, or more preferably 0.1% or more and 5% or less, in entire contents including the matrix and photochromic material. Optionally, a plurality of the photochromic materials listed above may be mixedly used for the light modulation layer 512. This allows for adjustment of tones of generated colors. For example, it is possible to achieve flat spectral absorption in the visible range, i.e., to realize black.

It is preferable to provide the protection layer 513 between the display layer 511 and the light modulation layer 512. The protection layer 513 is provided to cut the radiation of the modulation light (Lc) to the display layer 511 to prevent degradation (yellow discoloration) of the display layer 511 caused by being irradiated with the modulation light (Lc). The protection layer 513 preferably includes a material that selectively absorbs or reflects ultraviolet (UV) or infrared (IR) that is used as the modulation light (Lc). Examples of such materials include scattering agents such as zinc oxide or titanium oxide, and absorbents such as octyl methoxycinnamate (or ethylhexyl methoxycinnamate), t-butyl methoxydibenzoylmethane, oxybenzone-3, cyanine dye, phthalocyanine dye, or squarylium dye. The protection layer 513 has a thickness of 1 μm or more and 200 or less, for example.

1-2. Screen Control Method

In this embodiment, the transmittance or reflectance of the light modulation layer 512 that is part of the screen 50 is controlled as follows.

FIG. 3 illustrates an absorption spectrum of TPC-0033 that is one example of a photochromic material. It is preferable to use a different wavelength for the modulation light (Lc) from the wavelength region used for displayed images. For example, it is preferable to use light of a wavelength of 420 nm or less.

FIG. 4 illustrates a relationship between the excitation light intensity and the response speed when the light modulation layer 512 containing TPC-0033 dispersed in a matrix of, for example, polyurethane is irradiated with a wavelength of 365 nm as an absorption peak wavelength (excitation light). FIG. 4 illustrates the time from the irradiation with excitation light until the transmittance reaches 0.1, where the transmittance when transparent is taken as 1 and the transmittance that is eventually reached by irradiation with excitation light is taken as 0. Namely, it is seen that the higher the excitation light intensity is, the shorter the response time of the light modulation layer 512 that uses a photochromic material becomes.

FIG. 5 illustrates a relationship between the excitation light intensity and the transmittance after one second of the light modulation layer 512 containing TPC-0033 dispersed in a matrix of, for example, polyurethane, when the light modulation layer 512 is irradiated with a wavelength of 365 nm as the excitation light. As is seen from FIG. 5, the transmittance after a certain time of the light modulation layer 512 in which a photochromic material is used lowers with an increase in the light intensity of the modulation light (Lc). Therefore, continuous irradiation of the light modulation layer 512 with modulation light (Lc) with a high light intensity in an attempt to shorten the response time will result in a divergence from a desired transmittance.

In this embodiment, a combination of two light intensities (high light intensity (first control light; Lc1) and low light intensity (second control light; Lc2)) is used as the modulation light (Lc). Here, the first control light (Lc1) is modulation light (Lc) with a high intensity that allows for shortening of response time, and the second control light (Lc2) is modulation light (Lc) that allows for retention of the transmittance of the light modulation layer 512 and that has a lower light intensity than that of the first control light (Lc1). The first control light (Lc1) and the second control light (Lc2) each have the same wavelength, preferably. This allows for use of one light source for the modulation light (Lc), which enables a size reduction of the projection unit 60.

FIG. 6 is a timing chart illustrating one example of a light irradiation pattern for the screen 50 irradiated with the first control light (Lc1) and the second control light (Lc2) in this embodiment. First, the first control light (Lc1) with a high light intensity is projected, after which the second control light (Lc2) with a low light intensity is projected continuously. This shortens the time (response time) until a desired transmittance of the light modulation layer 512 is achieved.

FIG. 7 is a timing chart illustrating another example of a light irradiation pattern for the screen 50 irradiated with the first control light (Lc1) and the second control light (Lc2) in this embodiment. As illustrated in FIG. 7, the transmittance of the light modulation layer 512 is retained, too, by intermittently irradiating the light modulation layer 512 with the second control light (Lc2) that retains the transmittance of the light modulation layer 512, after a desired transmittance of the light modulation layer 512 is achieved by the irradiation with the first control light (Lc1).

Note, the control light for controlling the transmittance of the light modulation layer 512 is not limited to the two types, the first control light (Lc1) and the second control light (Lc2). For example, control light with three light intensities may be used. For example, light (third control light) with an even lower light intensity than that of the second control light (Lc2) may be projected during a period in which the excitation light intensity is 0 in FIG. 7.

Examples of applicable light sources that output the modulation light (Lc) in this embodiment include a laser, LED, halogen lamp, fluorescent lamp, mercury lamp, xenon lamp, krypton lamp, metal halide lamp, sodium-vapor lamp, and HID lamp. Among the light sources listed above, it is preferable to use an LED, from viewpoints of size reduction of the projection unit 60 and controllability of wavelength band and intensity. One reason for this is that, for example, an LED with a peak wavelength of 365 nm has a wavelength of from 350 nm to 380 nm at which 10% of the peak intensity is achieved, and an LED with a peak wavelength of 405 nm has a wavelength of from 390 nm to 420 nm at which 10% of the peak intensity is achieved, and because these hardly overlap the visible range, it is possible to use the light as the control light.

Note, a plurality of types of light having different wavelengths may be used in combination as the modulation light (Lc). Table 1 illustrates the response time with the excitation light of respective wavelengths. It is seen that, in a case where the light modulation layer 512 is irradiated with each of an excitation wavelength of 365 nm and an excitation wavelength of 405 nm as the modulation light (Lc), a shorter response time is achieved with a lower intensity with the excitation wavelength of 365 nm. This indicates that it is possible to shorten the time (response time) until a desired transmittance of the light modulation layer 512 is achieved by using excitation light of different wavelengths as the first control light (Lc1) and the second control light (Lc2).

TABLE 1

| 365 nm | | 405 nm | |
| --- | --- | --- | --- |
| Intensity (W/cm$^2$) | Response time (s) | Intensity (W/cm$^2$) | Response time (s) |
| 1.57 | 0.34 | 2.56 | 1.2 |
| 2.98 | 0.1 | 4.61 | 0.6 |

1-3. Configuration of Projection-Type Display Apparatus

The projection-type display apparatus 1 of this embodiment includes, as described above, the light source unit 10, illumination optical system 20, image forming unit 30, projection optical system 40, and the screen 50 described above, in this order. Note, the illumination optical system 20 and image forming unit 30 correspond to one specific example of an image generation optical system of the present disclosure. While FIG. 1 illustrates the projection-type display apparatus 1 as a transmissive 3LCD (liquid crystal display) type that performs light modulation with transmissive liquid crystal panels (liquid crystal panels 312R, 312G, and 312B), the projection-type display apparatus is not limited to this type. For example, the projection-type display apparatus may be configured as a reflective 3LCD type that performs light modulation with reflective liquid crystal panels.

Note, the projection-type display apparatus 1 of this embodiment is applicable also to projectors that use, for example, an LCOS (Liquid crystal on silicon), an MEMS (Micro Electro Mechanical Systems) mirror, or a digital micro mirror device (DMD: Digital Micro-mirror Device) and the like, instead of transmissive liquid crystal panels and reflective liquid crystal panels.

A light source that emits white light containing red light (R), blue light (B), and green light (G) necessary for a color image display is disposed in the light source unit 10. In this embodiment, another light source that emits other light than RGB (for example, UV) as the modulation light (Lc) is disposed in the light source unit 10. These light sources include, for example, a halogen lamp, a metal halide lamp, a xenon lamp, or the like. Moreover, a solid state light source such as a semiconductor laser (LD) or a light emitting diode (LED) may also be used. Because this light source for light modulation shares the same optical system as that of the light source for the color image display, the position alignment between the displayed image by image light (Li) and the image by the modulation light (Lc) is made easy, and the configuration of the projection-type display apparatus 1 is made simpler.

The illumination optical system 20 includes, for example, dichroic mirrors 211, 212, and 213, and total-reflection mirrors 214, 215, 216, and 217.

The dichroic mirror 211 is disposed on an optical path of the light source and has a function of splitting the light (R, G, B, UV) outputted from the light source unit 10 into ultraviolet (UV) and other light (R, G, B). The dichroic mirror 211 is likewise disposed on the optical path of the light source and has a function of splitting the light (R, G, B) that has passed through the dichroic mirror 211 to red light (R) and other light (G, B). The dichroic mirror 212 is likewise disposed on the optical path of the light source and has a function of splitting the light (G, B) that has passed through the dichroic mirror 212 to green light (G) and other light (B).

The total-reflection mirror 214 is disposed on an optical path of the ultraviolet (UV) reflected by the dichroic mirror 211, and reflects the ultraviolet (UV) reflected by the dichroic mirror 211 toward a polarizing plate 218. The total-reflection mirror 215 is disposed on an optical path of the red light (R) reflected by the dichroic mirror 212, and reflects the red light (R) reflected by the dichroic mirror 212 toward a polarizing plate 311R. The total-reflection mirror 216 is disposed on an optical path of the blue light (B) that has passed through the dichroic mirror 213, and reflects the blue light (B) that has passed through the dichroic mirror 213 toward the total-reflection mirror 217. The total-reflection mirror 217 is disposed on the optical path of the blue light (B) reflected by the total-reflection mirror 216, and reflects this blue light (B) toward a polarizing plate 311B.

The image forming unit 30 includes the polarizing plates 311R, 311G, and 311B, liquid crystal panels 312R, 312G, and 312B, polarizing plates 313R, 313G, and 313B, and a dichroic prism 314.

The polarizing plate 311R is disposed on an optical path of the red light (R) and has a function of splitting the incoming red light (R) into two mutually orthogonal polarizing components on a polarization splitting surface. The polarizing plate 311G is disposed on an optical path of the green light (G) and has a function of splitting the incoming green light (G) into two mutually orthogonal polarizing components on a polarization splitting surface. The polarizing plate 311B is disposed on an optical path of the blue light (B) and has a function of splitting the incoming blue light (B) into two mutually orthogonal polarizing components on a polarization splitting surface. Each polarization splitting surface reflects one polarization component (for example, S polarization component), and transmits the other polarization component (for example, P polarization component).

The liquid crystal panels 312R, 312G, and 312B are transmissive liquid crystal panels that generate image light of respective colors by modulating the incoming light on the basis of an input image signal. The liquid crystal panel 312R is disposed on an optical path of the red light (R) reflected on the polarization splitting surface of the polarizing plate 311R. The liquid crystal panel 312R is driven by a digital signal that has been subjected to pulse width modulation (PWM) in accordance with a red image signal, for example, and has a function of thereby modulating the incoming light and transmitting the modulated light toward the polarizing plate 313R. The liquid crystal panel 312G is disposed on an optical path of the green light (G) reflected on the polarization splitting surface of the polarizing plate 311G. The liquid crystal panel 312G is driven by a digital signal that has been subjected to pulse width modulation (PWM) in accordance with a green image signal, for example, and has a function of thereby modulating the incoming light and transmitting the modulated light toward the polarizing plate 313G. The liquid crystal panel 312B is disposed on an optical path of the blue light (B) reflected on the polarization splitting surface of the polarizing plate 311B. The liquid crystal panel 312B is driven by a digital signal that has been subjected to pulse width modulation (PWM) in accordance with a blue image signal, for example, and has a function of thereby modulating the incoming light and transmitting the modulated light toward the polarizing plate 313B.

The polarizing plates 313R, 313G, and 313B are disposed on optical paths of pieces of light of respective colors (R, G, B) that have passed through the liquid crystal panels 312R, 312G, and 312B, respectively, and have a function of splitting the incoming colored light (R, G, B) into two mutual orthogonal polarization components similarly to the polarizing plates 311R, 311G, and 311B described above. Each polarization splitting surface reflects one polarization component (for example, S polarization component), and transmits the other polarization component (for example, P polarization component) to be inputted to the dichroic prism 314.

The dichroic prism 314 superposes and combines the red light (R), green light (G), and blue light (B) that enter from three directions, and outputs the combined image light (Li) toward the projection optical system 40.

The ultraviolet (UV) reflected by the total-reflection mirror 214 toward the polarizing plate 218 is split into two mutually orthogonal polarization components on the polarization splitting surface of the polarizing plate 218, where one polarization component (for example, S polarization component) is reflected, while the other polarization component (for example, P polarization component) is transmitted.

The liquid crystal panel 219 is a transmissive liquid crystal panel similarly to the liquid crystal panels 312R, 312G, and 312B, and generates modulation light (Lc) by modulating the incoming light on the basis of an input image signal. This liquid crystal panel 219 corresponds to one specific example of a spatial light modulating device of the present disclosure. The liquid crystal panel 219 is disposed on an optical path of the ultraviolet (UV) reflected on the polarization splitting surface of the polarizing plate 311R. Note, MEMS (Micro Electro Mechanical Systems) such as DLP (digital light processing) may be used for modulation of the modulation light. In a case where ultraviolet (UV) is used as the modulation light (Lc), in particular, degradation of the liquid crystal panel may become an issue, and therefore it is preferable to use MEMS that are less affected by ultraviolet (UV).

The polarizing plate 220 is disposed on an optical path of the ultraviolet ((UV), modulation light (Lc)) that has passed through the liquid crystal panel 219 and has a function of splitting the incoming ultraviolet (UV) into two mutually orthogonal polarizing components on the polarization splitting surface. Each polarization splitting surface reflects one polarization component (for example, S polarization component), and transmits the other polarization component (for example, P polarization component) toward a dichroic mirror 221.

The dichroic mirror 221 is disposed on optical paths of the image light (Li) and the modulation light (Lc), letting the image light (Li) pass through while reflecting the modulation light (Lc), and outputting the image light (Li) and the modulation light (Lc) toward the projection optical system 40.

The projection optical system 40 includes a plurality of lenses including a projection lens 411, and enlarges the image light (Li) combined by the dichroic prism 314, and the modulation light (Lc) reflected by the dichroic mirror 221, to be projected to the screen 50.

FIG. 8 is a schematic illustration of one example of a positional relationship between the screen 50 and the projection unit 60 including the light source unit 10, illumination optical system 20, image forming unit 30, and projection optical system 40, of the projection-type display apparatus 1. FIG. 9 and FIG. 10 illustrate a configuration of the screen 50 and the projection unit 60.

The screen illustrated in FIG. 9 is a rear screen 50A, i.e., the projection unit 60 is set on one side facing a surface S2 that is the back surface of the rear screen 50A. The image light (Li) and modulation light (Lc) are projected from the side of this surface S2 of the rear screen 50A, and the projected image light (Li) is reflected by the display layer 511 toward a surface S1, so that images are viewed from the front side (surface S1).

The screen illustrated in FIG. 10 is a front screen 50B, i.e., the projection unit 60 is set on one side facing a surface S2 of the front screen 50B, similarly to the rear screen 50A. The surface S2 of the front screen 50B is the front side facing the viewer. The image light (Li) and modulation light (Lc) are projected from the side of this surface S2 of the front screen 50B, and the projected image light (Li) is reflected by the display layer 511 toward the surface S2, so that images are viewed from the side of this surface S2.

In a case with a projection screen that reflects the entire visible range, it is preferable to form the light modulation layer 512 on the side facing the viewer. With a transparent screen or a half mirror, it is preferable to form the light modulation layer on the side facing the viewer, or on the opposite side. This allows a reduction of the black level to be achieved as desired. Note, both screens (50A and 50B) have a configuration similar to that of the screen 50 illustrated in FIG. 2.

Further, in a case where ultraviolet (UV) or infrared (IR) is used as the modulation light (Lc) in the projection-type display apparatus 1, the projection unit 60 is preferably surrounded by a shield member 70 continuous with the screen 50, for example, as illustrated in FIG. 10. The shield member 70 preferably includes a film or the like that absorbs the light (in particular, UV or IR) used as the modulation light (Lc), for example. This allows for reduction of the influence of the stray light of ultraviolet (UV) or infrared (IR) on external objects and the like.

Moreover, the light source of the image light (Li) and the light source of the modulation light (Lc) do not necessarily have to share the same optical system. As long as the position of the displayed image by the image light (Li) and the position of the image by the modulation light (Lc) are aligned, the projection-type display apparatus 1 may use a projection unit 60A for the image light (Li), having an optical system for the light source of the image light (Li), and a projection unit 60B for the modulation light (Lc), having a different optical system from the optical system for the light source of the image light (Li), as illustrated in FIG. 12.

Further, while FIG. 12 illustrates the projection units 60A and 60B disposed on the same side (for example, on the side of the surface S1) of the screen 50, the arrangement is not limited to this. For example, in a case where the display member 510 includes a transmissive screen or a half mirror, one of the projection units 60A and 60B may be disposed on the side of the surface S1 of the screen 50, while the other may be disposed on the side of the surface S2 of the screen 50.

1-4. Workings and Effects

As described above, a reduction in contrast under a bright environment, i.e., lowered visibility, is an issue in an image display that uses a common projector. One reason for this is that the background luminance is at the black level of the screen. This tendency is evident in particular with transparent screens. For example, in a case where an image of a person, for example, is projected to a transparent screen as illustrated in FIG. 13, the background is transparent, and black parts, in particular, become buried in the background. If the black level can be made lower than the background luminance, images by the projector will be viewable even in a bright place, which widens the application areas of projector devices.

A possible method of causing a desired region to have a darker level of luminance than that of the background depending on the display is to use active devices such as TFTs in the screen. In this case, however, a cost increase and size limitations etc. arise, which in turn compromises the advantage of a projector that allows for display of any desired size. Moreover, for transparent screens, this is a cause of a reduction in transmittance. With a transparent OLED (Organic Light Emitting Diode) display, for example, the transmittance is about 50% even in a case where transmittance is enhanced by disposing a light emitting part on a wiring line. A transmittance higher than this is desirable for a projection screen of a projector. As another example, a screen has been developed, which has a liquid crystal region switchable between a transmissive state and a colored state disposed outside a liquid crystal region switchable between a transmissive state and a scattering state to achieve an enhanced feel of contrast.

Thus, development of a screen that allows for reduction of luminance of a desired region to a level lower than an environmental luminance while maintaining projection size flexibility as a feature of a projector, and a projection-type display apparatus equipped with this screen, are sought after.

The projection-type display apparatus 1 of this embodiment uses a display member 510 formed to contain a photochromic material that colors (generates a color) by being irradiated with excitation light, as the screen 50. The photochromic material, however, has a slow response speed. For example, it takes time in the order of seconds to minutes for the material to reach a colored state from a transparent state. This is in particular evident during the time until a gray level, or half of the black level, is reached. This is why development of a control method is desirable, which realizes a response speed equivalent of a moving image frame rate, while enabling the color density to reach a desired gradation level.

In this respect, a combination of two light intensities, for example, (high light intensity (first control light; Lc1) and low light intensity (second control light; Lc2)) is used as the excitation light (modulation light (Lc)) of the photochromic material in this embodiment. Specifically, the screen 50 is irradiated with first control light (Lc1) having a higher intensity, and after that, with second control light (Lc2) having a lower intensity than the first control light (Lc1) continuously or intermittently. This enables increase of the coloring speed of the photochromic material.

As described above, the projection-type display apparatus 1 of this embodiment uses a photochromic material as a coloring material that causes the visible light transmittance or reflectance of the screen 50 to change depending on light, and uses two light intensities for the light (modulation light (Lc)) to irradiate the screen in sequence, as the light that causes the transmittance or reflectance of the screen 50 containing the photochromic material to change. Specifically, the first control light (Lc1) having a higher intensity is projected first, and after that, the second control light (Lc2) having a lower intensity than the first control light (Lc1) is projected continuously or intermittently. This enables rapid coloring of the photochromic material, and allows for realization of a response speed corresponding to a moving image frame rate. This also enables retention of a transmittance condition of the screen 50 that has changed by the coloring of the photochromic material. Accordingly, it is made possible to reduce the black level of a desired region of the screen 50, in particular, a black part of a projected image, to a level equal to or lower than an environmental luminance, and to enhance the contrast of the displayed image. For example, it is made possible to display an image without the background becoming transparent even on a transparent screen as illustrated in FIG. 14. Namely, it is made possible to provide a screen 50 with high display qualities, and a projection-type display apparatus 1 equipped with the same.

Next, modification examples of the present disclosure are described. In the following, constituent elements similar to those of the embodiment described above are given the same reference signs and redundant description thereof is omitted.

2. MODIFICATION EXAMPLES

2-1. Modification Example 1

FIG. 15 illustrates a cross-sectional configuration of a screen 80 according to Modification Example 1 of the present disclosure. The screen 80 of this modification example includes a display member 810 having the display layer 511 and the light modulation layer 512 described in the embodiment above integrated to each other.

The display member 810 of this modification example may be formed using a scattering agent, and one of the photochromic materials described above, for example. This provides the screen 80 with a single layer structure, and an effect that allows for a reduction of the number of screen production process steps, in addition to the effects of the embodiment described above. Moreover, an improvement in the production yield is made possible.

2-2. Modification Example 2

FIG. 16 illustrates a cross-sectional configuration of a screen 90 according to Modification Example 2 of the present disclosure. The screen 90 of this modification example has a display member 910 with a configuration in which a light modulation layer 912 is stacked on the display layer 511. The light modulation layer 912 has the light modulation layer 512 and the protection layer 513 of the embodiment described above that are integrated to each other.

The light modulation layer 912 of this modification example has a light modulation function by which the modulation light (Lc) is absorbed and transmittance or reflectance is changed, and a protection function that prevents degradation of the display layer 511 in a case where ultraviolet (UV) or infrared (IR) is used as the modulation light (Lc). The light modulation layer 912 may be formed using, for example, any of the photochromic materials described above, and a polymer material containing, for example, a scattering agent such as zinc oxide or titanium oxide and an absorbent such as octyl methoxycinnamate (or ethylhexyl methoxycinnamate), t-butyl methoxydibenzoylmethane, oxybenzone-3, cyanine dye, phthalocyanine dye, or squarylium dye. This provides an effect that allows for a reduction of the number of screen production process steps, in addition to the effects of the embodiment described above, similarly to Modification Example 1. Moreover, an improvement in the production yield is made possible.

While the present disclosure has been described in terms of one embodiment and modification examples above, the present disclosure is not limited to the embodiment and others, and various modifications are possible. For example, materials, thicknesses and so on of various components of the screen 50 (50A and 50B) are not limited to the examples given in the embodiment and others described above, and other materials and thicknesses may be employed. Moreover, the configuration of the projection-type display apparatus 1 described in the embodiment above is one example. The projection-type display apparatus does not have to include all the optical members, and may be configured using other optical members.

The following are possible configurations that may be adopted in the present technique.

(1)
A projection screen control method including:
irradiating a display member with first control light; and
irradiating the display member with second control light,
in which
the irradiating the display member with the first control light and the irradiating the display member with the second control light are performed in sequence,
the display member has a visible light transmittance or a visible light reflectance that varies depending on light, and contains a photochromic material, and
the first control light and the second control light have different light intensities.

(2)
The projection screen control method according to (1), in which the first control light and the second control light have a wavelength of 420 nm or less.

(3)
The projection screen control method according to (1) or (2), further including:
a spatial light modulating device; and
controlling, with the spatial light modulating device, a region of the display member to be irradiated with the first control light and the second control light.

(4)
The projection screen control method according to any one of (1) to (3), in which the first control light has a light intensity higher than a light intensity of the second control light.

(5)
The projection screen control method according to any one of (1) to (4), in which the display member is irradiated with the first control light, after which the display member is irradiated with the second control light.

(6)
The projection screen control method according to any one of (1) to (5), in which the display member is irradiated with the first control light for a predetermined time, after which the display member is irradiated with the second control light continuously.

(7)
The projection screen control method according to any one of (1) to (5), in which the display member is irradiated with the first control light for a predetermined time, after which the display member is irradiated with the second control light intermittently.

(8)
The projection screen control method according to any one of (1) to (7), in which
the display member includes a display layer that displays an image, and a light modulation layer having a varying transmittance and a varying reflectance and containing the photochromic material, and
the transmittance and the reflectance of the light modulation layer are varied by the first control light and the second control light.

(9)
A projection-type display apparatus including:
a light source unit;
an image generation optical system that generates image light by modulating, on the basis of an input image signal, light from the light source unit;
a projection optical system that projects the image light generated by the image generation optical system; and
a projection screen that displays the image light projected from the projection optical system, in which
the projection screen includes a display member, the display member having a visible light transmittance or a visible light reflectance that varies depending on light, and containing a photochromic material, and
the light source unit includes a first light source section that outputs first control light and second control light that have different light intensities.

(10)
The projection-type display apparatus according to (9), in which the display member exhibits light transmissivity to a wavelength in a visible range when viewed from front.

(11)
The projection-type display apparatus according to (9) or (10), in which the display member includes:
a display layer that displays an image; and
a light modulation layer having a varying transmittance and a varying reflectance, and containing the photochromic material.

(12)
The projection-type display apparatus according to (11), in which the light modulation layer contains a polymer material as a matrix and contains the photochromic material in a percentage by weight of 0.01% or more and 10% or less in the polymer material.

(13)
The projection-type display apparatus according to (11) or (12), in which the display member includes, between the display layer and the light modulation layer, a protection layer that absorbs or reflects the first control light and the second control light.

(14)
The projection-type display apparatus according to any one of (11) to (13), in which the display layer includes any one of a hologram, a half mirror, a surface plasmon particle, a cholesteric liquid crystal, and a Fresnel lens.

(15)
The projection-type display apparatus according to any one of (9) to (14), in which the light source unit includes, as a light source that generates the image light, a second light source section that outputs light of a wavelength different from wavelengths of the first control light and the second control light.

(16)
The projection-type display apparatus according to any one of (9) to (15), in which the first control light and the second control light share a same optical system with the image light.

This application claims the benefit of Japanese Priority Patent Application JP 2018-067313 filed with the Japanese Patent Office on Mar. 30, 2018, the entire contents of which are incorporated herein by reference.

It should be understood by those skilled in the art that various alterations, combinations, sub-combinations, and changes may occur depending on design requirements and other factors insofar as they are within the scope of the appended claims or the equivalents thereof.

The invention claimed is:

1. A projection screen control method, comprising:
irradiating a display member with first control light; and
irradiating the display member with second control light, wherein
the irradiating the display member with the first control light and the irradiating the display member with the second control light are performed in sequence,
the display member has a visible light transmittance or a visible light reflectance that varies depending on light, and contains a photochromic material,
the first control light and the second control light have different light intensities, and
the display member includes a display layer, a light modulation layer that contains the photochromic material, and includes a protection layer between the display layer and the light modulation layer.

2. The projection screen control method according to claim 1, wherein the first control light and the second control light have a wavelength of 420 nm or less.

3. The projection screen control method according to claim 1, further comprising:
controlling, with a spatial light modulating device, a region of the display member to be irradiated with the first control light and the second control light.

4. The projection screen control method according to claim 1, wherein the first control light has a light intensity higher than a light intensity of the second control light.

5. The projection screen control method according to claim 1, wherein the display member is irradiated with the first control light, after which the display member is irradiated with the second control light.

6. The projection screen control method according to claim 1, wherein the display member is irradiated with the first control light for a predetermined time, after which the display member is irradiated with the second control light continuously.

7. The projection screen control method according to claim 1, wherein the display member is irradiated with the first control light for a predetermined time, after which the display member is irradiated with the second control light intermittently.

8. The projection screen control method according to claim 1, wherein the display layer is configured to display an image, and the light modulation layer having a varying transmittance and a varying reflectance, and
the transmittance and the reflectance of the light modulation layer are varied by the first control light and the second control light.

9. A projection-type display apparatus, comprising:
a light source unit;
an image generation optical system that is configured to generate image light based on modulation of light from the light source unit on a basis of an input image signal;
a projection optical system that is configured to project the image light generated by the image generation optical system; and
a projection screen that is configured to display the image light projected from the projection optical system, wherein
the projection screen includes a display member, the display member having a visible light transmittance or a visible light reflectance that varies depending on light, and contains a photochromic material,
the light source unit includes a first light source section that is configured to output first control light and second control light that have different light intensities, and
the display member includes a display layer, a light modulation layer that contains the photochromic material, and includes a protection layer between the display layer and the light modulation layer.

10. The projection-type display apparatus according to claim 9, wherein the display member is configured to exhibit light transmissivity to a wavelength in a visible range when viewed from front.

11. The projection-type display apparatus according to claim 9, wherein:
the display layer is configured to display an image; and
the light modulation layer having a varying transmittance and a varying reflectance.

12. The projection-type display apparatus according to claim 11, wherein the light modulation layer contains a polymer material as a matrix and contains the photochromic material in a percentage by weight of 0.01% or more and 10% or less in the polymer material.

13. The projection-type display apparatus according to claim 11,
wherein the protection layer is configured to absorb or reflect the first control light and the second control light.

14. The projection-type display apparatus according to claim 11,
wherein the display layer includes one of a hologram, a half mirror, a surface plasmon particle, a cholesteric liquid crystal, and a Fresnel lens.

15. The projection-type display apparatus according to claim 9, wherein the light source unit includes, as a light source that is configured to generates the image light, a second light source section that is configured to output light of a wavelength different from wavelengths of the first control light and the second control light.

16. The projection-type display apparatus according to claim 9, wherein the first control light and the second control light share a same optical system with the image light.

\* \* \* \* \*